Patented Aug. 4, 1942

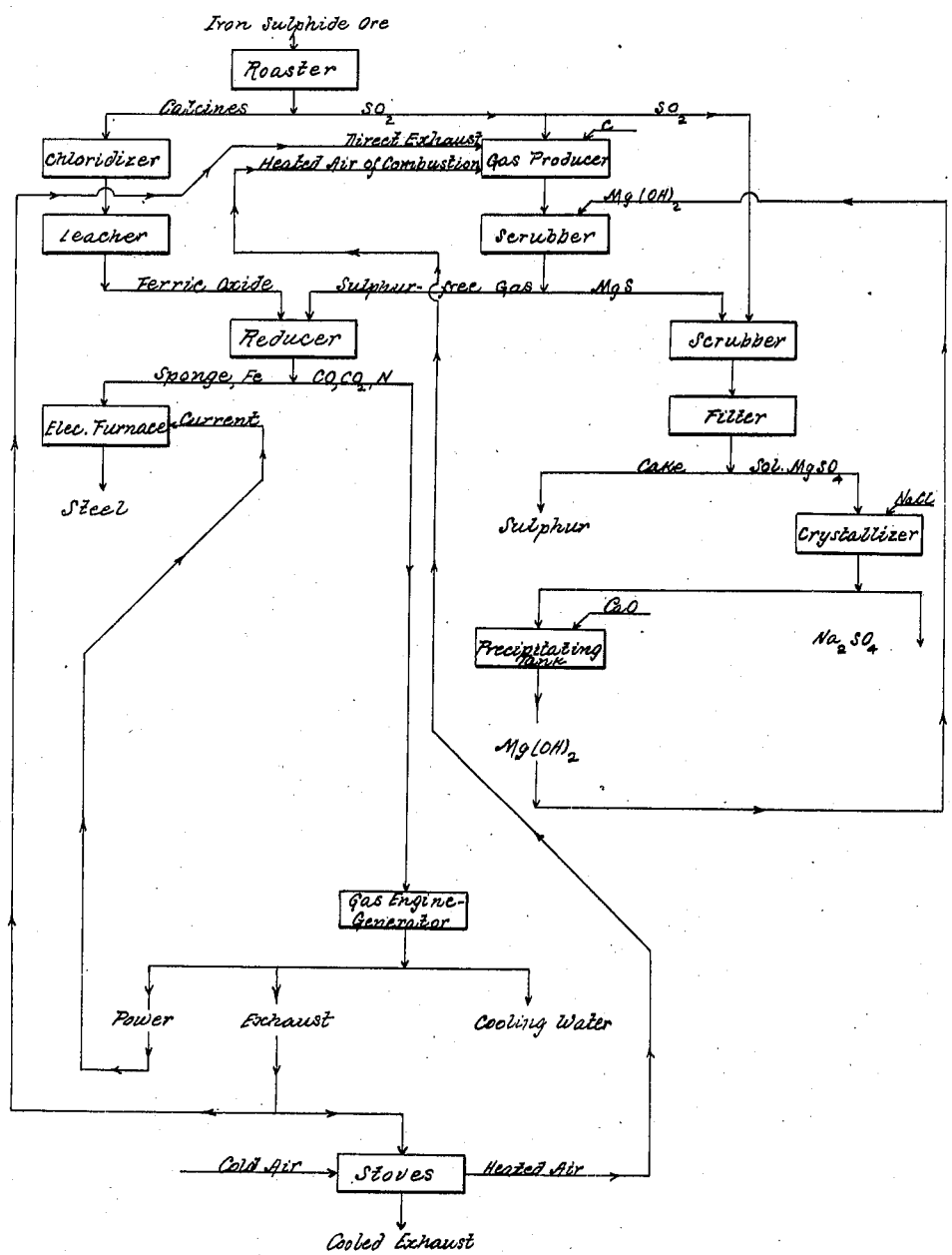

2,292,305

UNITED STATES PATENT OFFICE 2,292,305

IRON SULPHIDE METALLURGY

Alfred M. Thomsen, San Francisco, Calif.

Application October 27, 1941, Serial No. 416,648

4 Claims. (Cl. 75—34)

This invention deals in general with the separation of an iron sulphide into its constituent components in such a manner that the recovery of each component is facilitated and not hindered by the presence of the other component.

Iron sulphides are today considered as joint sources of sulphur and iron so there is nothing new in the conception of utilizing both in some form or manner. A familiar illustration is furnished by the conventional use of pyrite which is first burnt as a source of sulphur dioxide in sulphuric acid manufacture after which the calcines are nodulized and sent on to the high iron blast furnace as would be the case with any other iron ore.

In contra-distinction to this form of approach I obtain the major part of the sulphur in the form of elemental sulphur, with a subordinate amount in compound form, and the iron in the form of steel, as indicated in the attached flow sheet. All this is done in one process by means of a series of mutually dependent steps. A particular advantage of my process is that it does not make any demand for a high grade type of coke but that almost any type of solid fuel can be employed and evidently without any limitations as to its sulphur content.

It is, of course, inevitable that much common practice has to be recited in order to make the context readable but the item that I wish to specifically point out is the way in which a gas producer is made to serve simultaneously as a means of reducing sulphur from its oxide, iron from its oxide, and finally to furnish the power for the fusion of the reduced iron. An analysis of the flowsheet is the most acceptable manner in which the entire process can be studied so I will now describe said flowsheet in detail. The figure of the drawing shows a flowsheet of the process.

The sulphide is first seen entering a roaster where the sulphur is converted into sulphur dioxide. Depending upon the construction of this furnace the iron oxide produced in roasting may be rather free from sulphur or it may still contain an appreciable amount. In the latter case I have shown a convenient method by which such residual sulphur can be removed, i. e., by chloridizing and leaching. Such removal is, of course, conventional.

The ferric oxide, which is the ultimate result, is then indicated as entering into a reducer where it encounters a sulphur-free producer gas emanating from the gas producer that is considered as the central theme of the process.

The sulphur dioxide from the roaster is seen as separated into two portions one of which is reserved for further treatment and one portion which enters directly into the gas producer in such a manner that it traverses the combustion zone. In this manner it becomes reduced to elemental sulphur, part or all of which in turn becomes converted into hydrogen sulphide. Ultimately, therefore, the sulphur content of the sulphur dioxide entering the producer appears as sulphur, or as hydrogen sulphide, in the issuing gas stream. To remove this sulphur content and thus become the "sulphur-free gas" demanded by the reducer is accomplished in the next indicated device below the producer, namely the scrubber.

It will be evident that as most fuels contain sulphur, and hence will require subsequent gas purification if used as a source of reducing gas, it is a most practical method to permit of the use of a high sulphur fuel and to deliberately add additional sulphur in the form of sulphur dioxide.

In the scrubber the gas encounters a flow of magnesium hydroxide which absorbs hydrogen sulphide with the formation of magnesium sulphide while any elemental sulphur present is mechanically removed and simply commingles with the magnesium compound. The sulphur free gas is then seen as passed on to the reducer.

Following now the flow of the magnesium sulphide same is seen as entering a second scrubber where it encounters the reserved fraction of the original roaster gas. Reaction takes place according to the following equation:

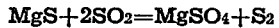

$$MgS + 2SO_2 = MgSO_4 + S_2$$

It will be evident that any sulphur present in elemental form will pass through unchanged and thus commingle with the sulphur liberated in the above reaction. By means of a filter separation is now made between the insoluble sulphur and the solution of $MgSO_4$.

A supplementary step has been added to show how the use of magnesium hydroxide can be rendered cyclic. If salt be added to the solution of magnesium sulphate and the mixture crystallized sodium sulphate will separate from a mother liquor of magnesium chloride, provided the temperature be dropped well below 35° C. Burnt lime is next added to this mother liquor which precipitates magnesium hydroxide and becomes itself converted into calcium chloride, which is discarded from the process. The magnesium hydroxide is then seen as returned to the process in the first scrubber. The production and discard of the solution of calcium chloride, being obvious, are not indicated on the flowsheet.

Returning now to the reducer where the desulphurized gas and the ferric oxide meet one another we see as end products sponge iron and a mixture of CO, $CO_2$, and N. It is self evident that this must take place at reaction temperatures and also that only half of the CO present can be oxidized to $CO_2$. As this reaction is well known no further description is necessary.

The spent gas, being of necessity of similar composition to blast furnace gas, is evidently excellent fuel for a gas engine, so the use of an electric furnace to melt the sponge iron is clearly indicated. An examination of the thermodynamic balance will, however, show that the amount of fuel thus rendered available will be insufficient to meet the requirements of the furnace.

The flow sheet indicates clearly the manner in which this objection can be overcome. The exhaust gas of the engine is indicated as returned in part to the combustion zone of the gas producer and in part as passing through heating stoves where its resident heat is transferred to the incoming air of combustion of the gas producer. In either event the heat resident in the exhaust is transferred to the producer and the contained heat energy then appears as chemical energy in the gas with consequent economy of fuel.

A minor step whereby the efficiency of the reducer can be somewhat increased will now be mentioned. At low temperatures there is no sintering of the ferric oxide but at higher temperatures it can become a chief source of trouble. On the other hand at low temperatures there will be considerable formation of carbon, technically referred to as "soot," by decomposition of the CO as indicated by the equation: $2CO = CO_2 + C$. In this reaction both the oxide of iron and the reduced iron can appear as catalysts. It goes without saying that reduction of the iron is more rapid at the higher temperatures so but for sintering troubles it would become the universal procedure.

One way in which this trouble from sintering can be nicely overcome is to cement the particles of iron oxide together within a matrix of coke. As little as 10% of coke on the weight of the iron is sufficient to form quite a compact but very porous mass, readily permeated by carbon monoxide gas. If the ferric oxide be mixed with a hydrocarbon which will leave such a residual coke, tar and heavy oils being excellent for the purpose, and then distilled then an excellent product which will not sinter can be readily obtained.

In any event, the process within the reducer is exothermic so that if the reacting components be but heated to reaction temperature the operation goes on to completion without the need of furnishing any outside heat.

Having thus fully described my process, I claim:

1. The method of separating iron sulphide into its components which comprises: An initial roast wherein the sulphur is converted principally into sulphur dioxide and the iron into ferric oxide; separating the sulphur dioxide into two parts one of which is made to traverse the combustion zone of a gas producer while the other is reserved for further treatment; washing the issuing gas from the producer with magnesium hydroxide to remove sulphur therefrom thus obtaining a sulphur-free gas and a sludge of magnesium sulphide; commingling said sludge with the reserved portion of the sulphur dioxide to obtain elemental sulphur and magnesium sulphate; contacting the ferric oxide obtained in the initial step with the sulphur-free gas from the gas producer at reaction temperatures to obtain sponge iron and residual gas; burning said gas in a gas engine to supply power for the fusion of the sponge iron in an electric furnace; and returning heat resident in the exhaust of said engine to the combustion zone of the gas producer.

2. The method of separating iron sulphide into its components as set forth in claim 1, with the added step that the ferric oxide produced thereunder be further purified from sulphur by chloridizing and leaching before it be contacted with the sulphur-free reducing gas for the purpose of conversion into sponge iron.

3. The method of separating iron sulphide into its components as set forth in claim 1, with the added step that the ferric oxide produced thereunder be agglomerated with the distillation residue of a hydrocarbon commingled with said ferric oxide before it be exposed to the action of the reducing sulphur-free producer gas.

4. The method of separating iron sulphide into its components as set forth in claim 1, with the added step that the use of the magnesium hydroxide prescribed therein be rendered cyclic by adding salt to the magnesium sulphate for the removal of the resident sulphate as sodium sulphate and then precipitating the residual magnesium chloride with lime to produce magnesium hydroxide.

ALFRED M. THOMSEN.